Aug. 30, 1927.

J. GERSTMAYR 1,640,445

INTERNAL COMBUSTION ENGINE

Filed June 23, 1924

Inventor:
Johann Gerstmayr,
by Alexander S. Lentz
His Attorney.

Patented Aug. 30, 1927.

1,640,445

UNITED STATES PATENT OFFICE.

JOHANN GERSTMAYR, OF BERLIN, GERMANY, ASSIGNOR TO GENERAL ELECTRIC COMPANY, A CORPORATION OF NEW YORK.

INTERNAL-COMBUSTION ENGINE.

Application filed June 23, 1924, Serial No. 721,756, and in Germany July 7, 1923.

The present invention relates to internal combustion engines and especially to internal combustion engines operated by a liquid combustible or fuel which is supplied to each engine cylinder by means of a fuel pump.

As is well-known in connection with internal combustion engines, when such engines are operated under conditions in which the load may be suddenly removed, it is customary to provide a speed regulator for limiting the upward speed of the engine. A condition of this character is met with, for example, in connection with the use of internal combustion engines for propelling ships. In such cases the engine runs often for a long time at full load and full speed, and during this time is under the control of a speed regulator which tends to keep the speed of the machine uniform and prevents racing of the engine when the load is suddenly taken off, a thing which may occur, for example, when there is a breaking of the propeller shaft.

In connection with the operation of internal combustion engines under conditions such as are met with in connection with ship propulsion, it happens sometimes that the engine is required to run for a considerable time at a decreased speed, for example, when traversing narrow waterways. At such times the speed may be one-half or one-third of the usual speed and under these conditions the speed regulator, which normally regulates the speed of the engine in its upward direction, is rendered inoperative on account of the throttling of the fuel pump. When operating under these conditions there is danger that the engine on account of insufficient fuel may come to a stop, a thing of course which it is very desirable to avoid.

The object of the present invention is to provide in connection with an internal combustion engine which engine may be provided with the ordinary speed regulator for maintaining its speed below a certain maximum, a special regulating device which serves to prevent the speed from falling below a certain minimum low value. By this means the result is accomplished but the engine is prevented from stopping when operating at low speeds due to insufficient fuel being supplied to it.

For a consideration of what I believe to be novel and my invention, attention is directed to the accompanying description and the claims appended thereto.

Figure 1:
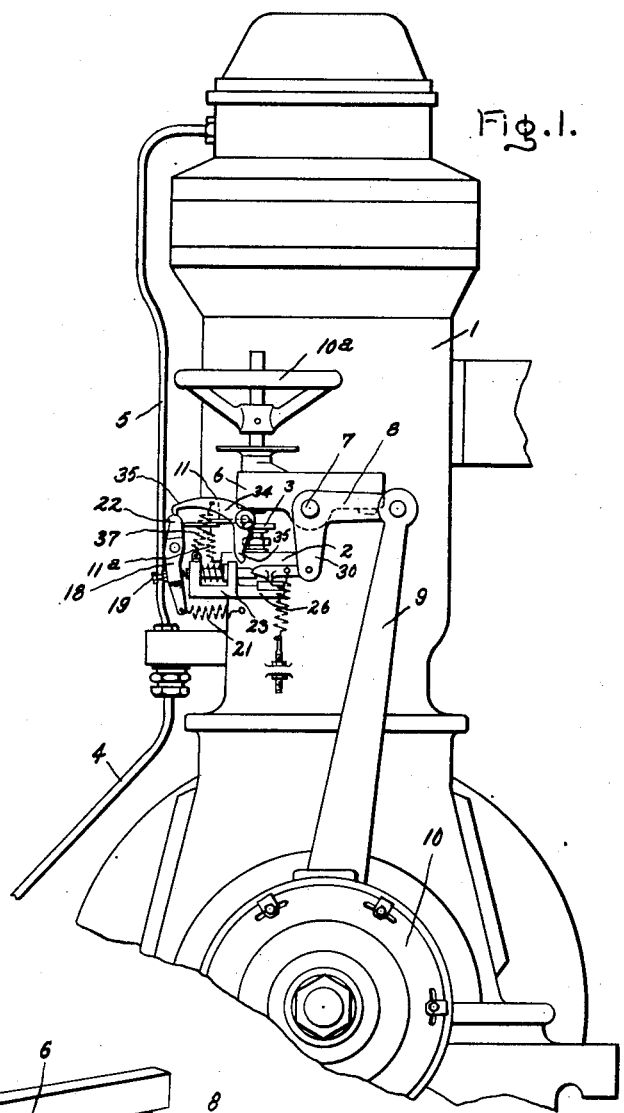
Figure 2:
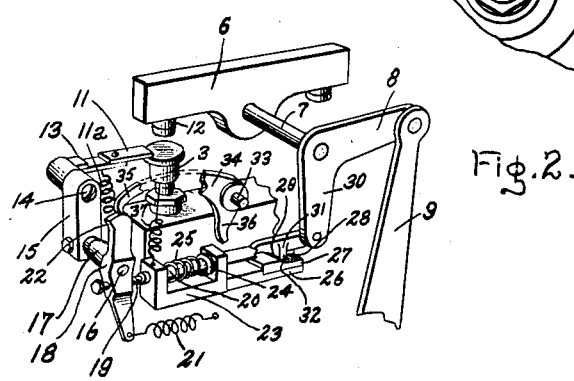

In the drawing, Fig. 1 is a diagrammatic side view of an internal combustion engine equipped with a speed regulator embodying my invention, and Fig. 2 is a detail perspective view of the mechanism of the speed regulator.

Referring to the drawing, 1 indicates an internal combustion engine which may be of any suitable type and which may comprise one or a plurality of cylinders. Fuel is supplied to the engine by a pump 2 provided with a plunger 3. The suction pipe for the pump is indicated at 4 and the discharge pipe at 5, the latter supplying fuel to the engine cylinder in any suitable manner. Pump 2 may be of any approved type such as is well known in the art. A suitable pump is one which comprises a cylinder in which a plunger reciprocates, the plunger being pressed upwardly by a suitable spring and the pump being provided with the usual suction and discharge valves. The details of the structure of the pump are not shown in this drawing as they form no part of the present invention.

The pump plunger 3 is operated by an oscillating arm 6 mounted on a shaft 7. On shaft 7 is fixed an arm 8 connected by a connecting rod 9 to suitable mechanism 10 on the engine crank shaft which mechanism serves to reciprocate connecting rod 9 and oscillate shaft 7 and arm 6. This arrangement is indicated diagrammatically only and may embody any suitable construction for operating the connecting rod 9 and also for regulating the length of the stroke, it being common practice to regulate the fuel supply of internal combustion engines provided with a fuel pump of this type by varying the length of the stroke of the pump. At 10ª is indicated a hand wheel which when operated regulates the amount of fuel delivered by pump 2.

The detail structure of the parts so far described form no part of the present invention and are shown only by way of example, and indicate generally a suitable construction with which the invention may be used.

According to the present invention there is provided a plate 11 which when the speed of the engine reaches a predetermined low value is automatically shifted to a position between the top of the pump plunger 3 and the part of arm 6 which strikes the plunger, such part being indicated in the drawing at 12. By this means it will be seen that the length of the stroke of the pump plunger will be increased thereby increasing the amount of fuel delivered by the pump to the engine. Plate 11 is attached to the end of an arm 13 which is pivotally mounted on a screw 14 which projects from the end of arm 15 which in turn is fixed on a shaft 16, shaft 16 being carried in a suitable stationary bearing 17. Plate 11 is held against the tip of plunger 3 by a spring 11ª. Fixed on shaft 16 is a lever arm 18 which is provided with an adjustable stop 19. Lever arm 18 is biased to a position where stop 19 is in engagement with the end of a plunger rod 20 by a suitable spring 21. The upper end of lever arm 18 is provided with a hook 22. Plunger rod 20 is carried in a U-shaped frame 23 and is provided with a fixed collar 24 between which and frame 23 is a spring 25 which biases plunger rod 20 to the position shown in Figs. 1 and 2 of the drawing, wherein collar 24 engages the frame. Collar 24 thus serves to limit the movement of plunger rod 20 in the one direction. Attached to a projection 26 on frame 23 is a member 27 provided with a runway 28 having an inclined surface 29, and on shaft 7 is an arm 30 to the end of which is pivotally connected an actuator 31 having a finger 32 which slides on runway 28. The end of actuator 31 is adapted to engage the right hand end of plunger rod 20 under certain circumstances. Carried by a fixed shaft 33 is a catch lever 34 having an end 35 adapted to engage hook 22 and a finger 36 adapted to be engaged by actuator 31. At 37 is a spring for holding end 35 of lever 34 in engagement with hook 22.

The operation is as follows: Assume that the engine is running at a low speed. At this time connecting rod 9 is imparting an oscillating movement to arm 6 of a predetermined length and this in turn is imparting to pump plunger 3 a stroke of predetermined length so as to deliver a suitable amount of fuel to the engine. Each time shaft 7 is oscillated by connecting rod 9, actuator 31 is slid along the runway 28 and up its inclined surface 32. If the engine is operating above a predetermined low speed then the actuator 31 in sliding up the inclined surface 32 is given such an impetus that it flies above the end of the plunger rod 20 and does not strike it but on the contrary will under ordinary conditions strike the end of finger 36 on catch 34. Under these circumstances plate 11 lies in the position shown in Figs. 1 and 2 of the drawing, its end resting on the outer edge of the top of pump plunger 3. It is held in this position by the spring 11ª and follows the movements of the pump plunger. If now the speed of the engine drops below the predetermined desired minimum value then under these circumstances the impetus given to actuator 31 by the runway 28 is not sufficient to throw it up away from the end of plunger rod 20, and as a result it strikes the end of the plunger rod moving it toward the left from the position shown in Figs. 1 and 2. This serves to turn lever arm 18 and shaft 16 in a clockwise direction thereby bringing plate 11 between the top of pump plunger 3 and the member 12 on arm 6 as already stated. This will then serve to lengthen the stroke of the pump plunger thereby supplying more fuel to the engine and causing it to increase in speed. When shaft 16 is turned by the plunger rod 20 hook 22 is moved under and is engaged by the end 35 of catch lever 34, thereby locking the plate 11 between the surfaces of pump plunger 3 and the member 12. The increased fuel supplied to the engine will cause the speed of the engine to increase and after it increases to a value above the predetermined low value then actuator 31 will fly up and strike the finger 36 on the end of catch lever 34 thereby moving end 35 from engagement with the end 22 of lever arm 17 and permitting spring 21 to move plate 11 back to its normal position.

Thus it will be seen that there is provided a means whereby the speed of the engine is prevented from decreasing below a predetermined low value whereby stopping of the engine under low speed conditions is avoided.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with an internal combustion engine, having a pump for supplying fuel to it and actuating means for the pump, of means which at normal speeds is inactive and comes into action when the speed of the engine decreases below a certain minimum low value for increasing the amount of fuel supplied by the pump to the engine, whereby the amount of fuel supplied to the engine cannot be diminished to an extent such that the engine will stop.

2. The combination with an internal combustion engine having a pump for supplying fuel to it, said pump comprising a plunger and means for actuating it, of means which at normal speeds is inactive and comes into action when the speed of the engine decreases below a certain minimum low value for increasing the length of stroke of the plunger to increase the amount of fuel supplied by the pump to the engine, whereby the amount of fuel supplied to the engine cannot be diminished to an extent such that the engine will stop.

3. The combination with an internal combustion engine and a pump for supplying fuel thereto, said pump having a plunger and an actuator therefor, there being a space between the plunger and actuator when the actuator is at the top of its stroke, of means which at normal speeds is inactive and comes into action when the speed of the engine decreases below a certain minimum low value for decreasing the width of said space so that the amount of fuel supplied by the pump to the engine is increased, whereby the amount of fuel supplied to the engine cannot be diminished to an extent such that the engine will stop.

4. The combination with an internal combustion engine and a pump for supplying fuel thereto, said pump having a plunger and an actuator therefor, there being a space between the plunger and actuator when the actuator is at the top of its stroke, of a plate and means which at normal speeds is inactive and comes into action when the speed of the engine decreases below a certain minimum low value for projecting the plate into said space so that the amount of fuel supplied by the pump to the engine is increased, whereby the amount of fuel supplied to the engine cannot be diminished to an extent such that the engine will stop, means for holding it in its projected position, and means for releasing said holding means when the speed of the engine is again increased.

5. The combination with an internal combustion engine and a pump for supplying fuel thereto, said pump having a plunger and an actuator therefor, there being a space between the plunger and the actuator when the actuator is at the top of its stroke, of a plate adapted to be projected into said space, means which serves to hold the plate out of said space at normal speeds, and means which comes into action when the speed of the engine decreases below a certain minimum low value for projecting the plate into said space and holding it there, whereby the amount of fuel supplied to the engine cannot be diminished to an extent such that the engine will stop.

6. The combination with an internal combustion engine and a pump for supplying fuel thereto, said pump having a plunger and an actuator therefor, there being a space between the plunger and the actuator when the actuator is at the top of its stroke, of a plate adapted to be projected into said space, means which serves to hold the plate out of said space at normal speeds, a plunger for projecting the plate into said space, and an actuator for moving the last-named plunger which actuator comes into operation when the speed of the engine decreases below a certain minimum low value whereby the amount of fuel supplied to the engine cannot be diminished to an extent such that the engine will stop.

7. The combination with an internal combustion engine and a pump for supplying fuel thereto, said pump having a plunger and an actuator therefor, there being a space between the plunger and the actuator when the actuator is at the top of its stroke, of a plate adapted to be projected into said space, means which serves to hold the plate out of said space at normal speeds, a plunger for projecting the plate into said space, an actuator for moving the last-named plunger which actuator comes into operation when the speed of the engine decreases below a certain minimum low value, means for holding the plate in such projected position whereby the amount of fuel supplied to the engine cannot be diminished to an extent such that the engine will stop, and means whereby when the speed of the engine increases again said last-named actuator releases the holding means.

In witness whereof, I have hereunto set my hand this 4th day of June, 1924.

JOHANN GERSTMAYR.